US011607999B2

(12) United States Patent
Mahnken et al.

(10) Patent No.: US 11,607,999 B2
(45) Date of Patent: Mar. 21, 2023

(54) METHOD AND APPARATUS FOR INVISIBLE VEHICLE UNDERBODY VIEW

(71) Applicant: GM GLOBAL TECHNOLOGY OPERATIONS LLC, Detroit, MI (US)

(72) Inventors: Brian Mahnken, Pinckney, MI (US); Bradford G. Schreiber, Clarkston, MI (US); Jeffrey Louis Brown, Waterford, MI (US); Shawn W. Ryan, Clarkston, MI (US); Brent T. Deep, Milford, MI (US); Kurt A. Heier, Fenton, MI (US); Upali P. Mudalige, Oakland Township, MI (US); Shuqing Zeng, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 825 days.

(21) Appl. No.: 16/579,896

(22) Filed: Sep. 24, 2019

(65) Prior Publication Data

US 2021/0086695 A1    Mar. 25, 2021

(51) Int. Cl.
| | |
|---|---|
| *G01S 17/89* | (2020.01) |
| *B60R 1/10* | (2006.01) |
| *B62D 21/18* | (2006.01) |
| *B62D 21/20* | (2006.01) |

(52) U.S. Cl.
CPC .......... *B60R 1/105* (2013.01); *B62D 21/183* (2013.01); *B62D 21/20* (2013.01); *G01S 17/89* (2013.01); *B60R 2300/205* (2013.01)

(58) Field of Classification Search
CPC ...... B60R 1/105; B62D 21/183; B62D 21/20; G01S 17/89

USPC .......................................................... 359/630
See application file for complete search history.

(56) References Cited

U.S. PATENT DOCUMENTS

| | | | |
|---|---|---|---|
| 5,146,334 A | 9/1992 | Fukatsu et al. | |
| 8,733,938 B2 | 5/2014 | Sachdev et al. | |
| 8,886,023 B2 | 11/2014 | Satoh | |
| 9,849,784 B1 | 12/2017 | Chan et al. | |
| 2015/0203035 A1 | 6/2015 | Watanabe | |
| 2017/0010618 A1* | 1/2017 | Shashua | G05D 1/0246 |
| 2017/0182942 A1 | 6/2017 | Hardy et al. | |
| 2018/0040151 A1* | 2/2018 | McCullough | H04N 5/247 |

(Continued)

FOREIGN PATENT DOCUMENTS

GB    2541906 A    8/2017

*Primary Examiner* — Nguyen T Truong
(74) *Attorney, Agent, or Firm* — Lorenz & Kopf LLP (57) ABSTRACT

The present application relates to a method and apparatus for generating a graphical user interface indicative of a vehicle underbody view including a LIDAR operative to generate a depth map of an off-road surface, a camera for capturing an image of the off-road surface, a chassis sensor operative to detect an orientation of a host vehicle, a processor operative to generate an augmented image in response to the depth map, the image and the orientation, wherein the augmented image depicts an underbody view of the host vehicle and a graphic representative of a host vehicle suspension system, and a display operative to display the augmented image to a host vehicle operator. A static and dynamic model of the vehicle underbody is compared vs the 3-D terrain model to identify contact points between the underbody and terrain are highlighted.

20 Claims, 5 Drawing Sheets

(56) References Cited

U.S. PATENT DOCUMENTS

2018/0136000 A1    5/2018  Rasmusson et al.
2019/0311546 A1*  10/2019  Tay .......................... G06T 5/50

* cited by examiner

METHOD AND APPARATUS FOR INVISIBLE VEHICLE UNDERBODY VIEW

BACKGROUND

The present disclosure relates generally to programming motor vehicle control systems. More specifically, aspects of this disclosure relate to systems, methods and devices for generating and presenting an underbody view of a vehicle to a vehicle operator.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various advanced driver-assistance systems (ADAS), such as cruise control, adaptive cruise control, and parking assistance systems correspond to lower automation levels, while true "driverless" vehicles correspond to higher automation levels.

ADAS typically use sensors such as LIDAR, RADAR and cameras to detect and map the area surrounding the host vehicle. ADAS may be more limited under off road conditions as typical road markers, lane markers, curbs, accurate map data and other man-made indicators are unavailable as references for the ADAS. Thus, getting stuck while driving in off-road conditions and reducing or eliminating any damage to the vehicle while off-roading are important operator concerns. Off-road driving usually requires assistance from outside the vehicle in navigating particularly challenging obstacles that can damage the vehicle. It would be desirable to address these problems by providing more information to a vehicle operator to improve the operator's awareness of the vehicle relative to the environment.

The above information disclosed in this background section is only for enhancement of understanding of the background of the invention and therefore it may contain information that does not form the prior art that is already known in this country to a person of ordinary skill in the art.

SUMMARY

Disclosed herein are vehicle sensing and presentation systems and related control logic for provisioning assisted vehicle control, methods for making and methods for operating such systems, and motor vehicles equipped with onboard control systems. By way of example, and not limitation, there is presented an automobile with onboard vehicle control learning and control systems.

In accordance with an aspect of the present invention, an apparatus is provided including a LIDAR operative to generate a depth map of an off-road surface, a camera for capturing an image of the off-road surface, a chassis sensor operative to detect an orientation of a host vehicle, a processor operative to generate an augmented image in response to the depth map, the image and the orientation, wherein the augmented image depicts an underbody view of the host vehicle and a graphic representative of a host vehicle suspension system, and a display operative to display the augmented image to a host vehicle operator.

In accordance with another aspect of the present invention a processor operative to generate a three-dimensional surface in response to the depth map.

In accordance with another aspect of the present invention a processor operative to perform an edge detection function on the image to correlate the image with the depth map.

In accordance with another aspect of the present invention a memory to store the depth map and the image and wherein the augmented image is generated in response to the host vehicle being located over the off-road surface.

In accordance with another aspect of the present invention wherein the orientation of the host vehicle is a six degrees of freedom orientation.

In accordance with another aspect of the present invention a processor operative to estimate a host vehicle location with respect to the off-road surface in response to the orientation of the host vehicle.

In accordance with another aspect of the present invention a processor operative to estimate a contact point between the host vehicle and the off-road surface and wherein the augmented image further includes an indication of the contact point.

In accordance with another aspect of the present invention a chassis sensor being at least one of an inertial measurement unit, a steering angle sensor, a wheel speed sensor, a suspension sensor and an inclinometer.

In accordance with another aspect of the present invention a method performed by a processor comprising: generating, with a LIDAR, a three-dimensional representation of a field of view of an off-road surface, capturing, with a camera, an image of the field of view of the off-road surface, determining a vehicle orientation in response to a chassis sensor, estimating a location of the vehicle within the off-road surface in response to the vehicle orientation, generating, with a processor, an augmented image depicting a three-dimensional view of the off-road surface in response to the three-dimensional representation and the image, and wherein the augmented image further includes a graphical representation of a vehicle drive train representative of the location of the vehicle within the off road surface, and displaying, with a vehicle cabin display, the augmented image to a host vehicle operator.

In accordance with another aspect of the present invention wherein the three-dimensional representation of the field of view is generated in response to a LIDAR depth map.

In accordance with another aspect of the present invention including detecting an edge within the image and aligning the three-dimensional representation and the image in response to the edge.

In accordance with another aspect of the present invention including storing, in a memory, the three-dimensional representation and the image and wherein the augmented image is generated in response to the vehicle being located over the off-road surface.

In accordance with another aspect of the present invention wherein the vehicle orientation is a six degrees of freedom orientation.

In accordance with another aspect of the present invention wherein estimating the location of the vehicle within the off-road surface includes comparing the vehicle orientation to the three-dimensional representation.

In accordance with another aspect of the present invention including estimating a contact point in response to the three-dimensional representation and the vehicle orientation and wherein the augmented image includes an indication of the contact point.

In accordance with another aspect of the present invention wherein the chassis sensor is at least one of an inertial measurement unit, a steering angle sensor, a wheel speed sensor, a suspension sensor and an inclinometer.

In accordance with another aspect of the present invention wherein estimating the location of the vehicle within the off-road surface includes detecting a vehicle location with a global positioning sensor.

In accordance with another aspect of the present invention wherein the augmented image is representative of a host vehicle underbody component relative to the off-road surface.

In accordance with another aspect of the present invention, an apparatus for generating a graphical user interface including a LIDAR for generating a depth map of a field of view, a camera for capturing an image of the field of view, a vehicle sensor for estimating a vehicle orientation, an image processor for generating a three-dimensional representation of the field of view in response to the depth map and the image and for generating an augmented image in response to the vehicle orientation and the three-dimensional representation of the field of view, and a display operative to display the graphical user interface including the augmented image to a vehicle operator.

In accordance with another aspect of the present invention wherein the image processor is further operative to estimate a vehicle location in response to the vehicle orientation and the three-dimensional representation of the field of view.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
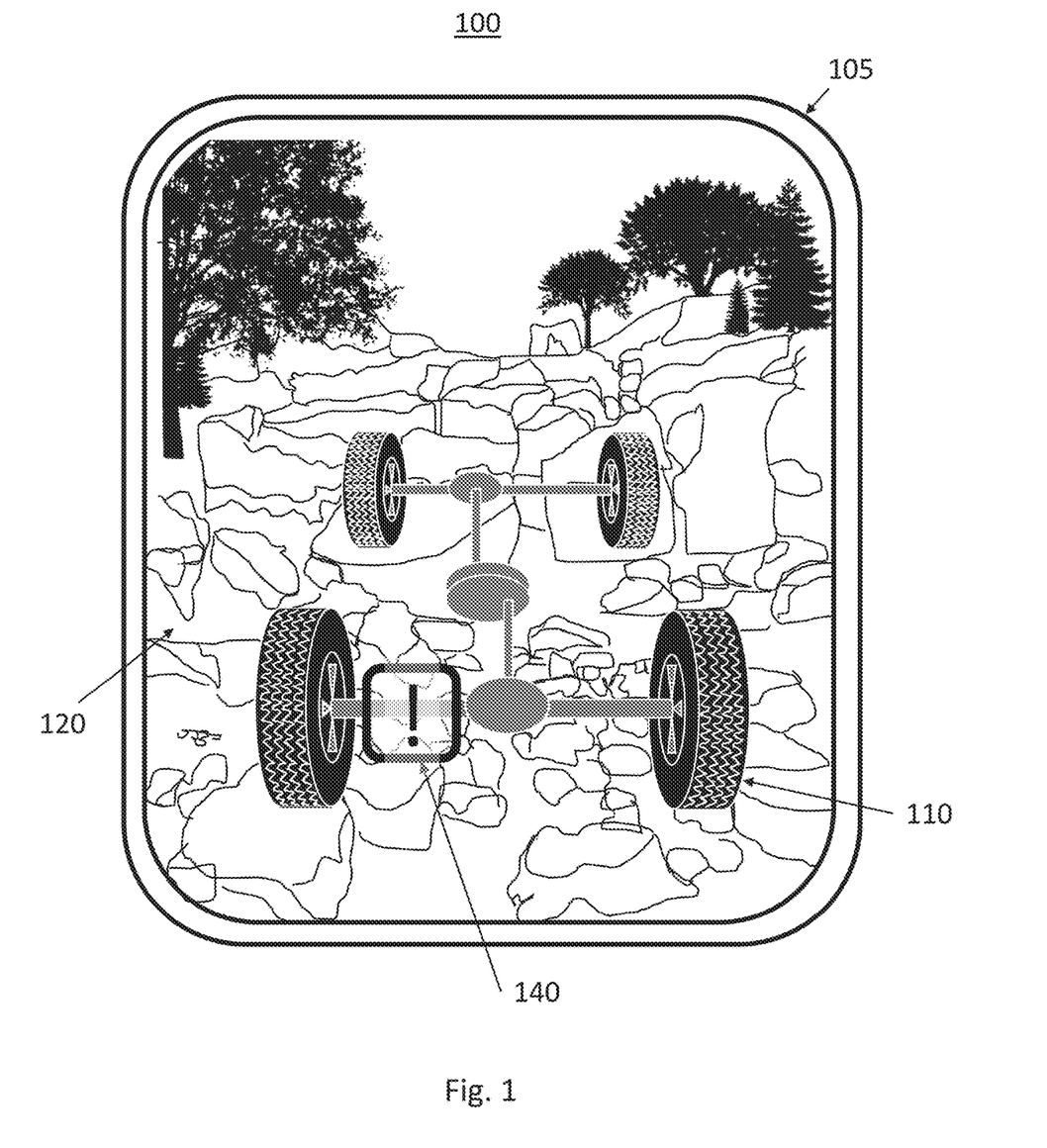
FIG. 1 shows an operating environment for underbody view generation and presentation in a vehicle according to an exemplary embodiment.

FIG. 1 schematically illustrates an operating environment 100 for underbody view generation and presentation in a vehicle. In this exemplary embodiment, an in-cabin display 105 is shown for an ADAS equipped off-road host vehicle. The display 105 is operative to show a user interface depicting a field of view (FOV) captured by a camera of an off-road surface 120. In this exemplary embodiment, the FOV may be a vehicle underbody view and the potential off-road surface may include rocks, trees and other obstacles.

The exemplary embodiment is operative to generate a three-dimensional terrain map of the off-road surface 120 relative to the critical underbody components of the vehicle, using predictive autonomous technology including ultrasonic sensors, wide FOV camera views, LIDAR, RADAR, wheel speed, steering angle sensor, inclinometer, and/or suspension kinematics. In response to the three-dimensional terrain may an image view including a computer generated representation of the vehicle underbody 110 and ground obstacles are presented to the vehicle operator. The exemplary application may present various image view options including the underbody 110 and ground obstacles to the vehicle operator. Various image views may include a bird's eye view, isometric view, vehicle side profile, or drivers view with invisible engine hood. These various views may be generated in response to images captured by a camera, augmented reality images, or computer-generated graphics in response to the three-dimensional terrain map. In one exemplary embodiment a generated vehicle suspension system 110 may be displayed to highlight potential contact points 140 of the vehicle to the off-road surface in the image as an aid for use by the vehicle operator in navigating off-road obstacles.

In an exemplary application, the system may be operative to combine autonomous technology, vehicle bus and global positioning information, camera/LIDAR/RADAR/ultrasonic data, and vehicle kinematics to generate a 3D terrain/vehicle model highlighting potential underbody impact points 140. As the vehicle is driven forward, the autonomous sensors may build and "buffer" a 3-D model of the upcoming terrain. Using the vehicle kinematic model, steering angle, inertial measurement unit (IMU), a global positioning system (GPS) and wheel speed sensors may be used to identify the vehicle position relative to the off-road surface. The system is next operative to generate an augmented image including the off-road surface and a graphic representative of the vehicle underbody components including wheel positions relative to the off-road surface. In one exemplary embodiment, contact or collision points 140 may be highlighted for on the augmented image. This "invisible underbody" may provide the vehicle operator a view of the underbody of the off-road vehicle in order to assist off road mobility driving, water fording, and trailer views. In another exemplary embodiment, a trailer with accessory camera can be used to extend underbody view to the trailer. Computer modelling may be used with object detection to determine the length of the trailer with axle placement based on pivot point geometry.

Figure 2:
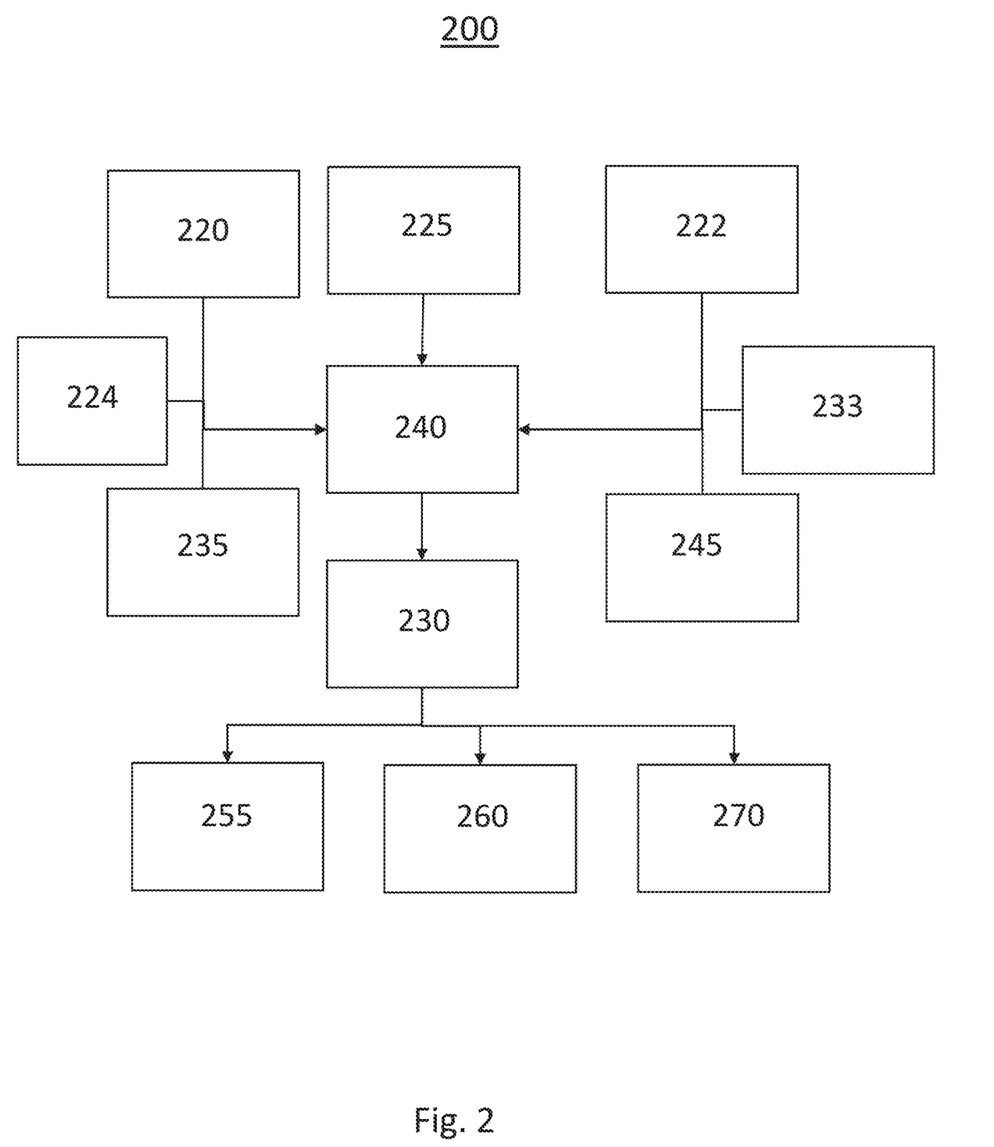
FIG. 2 shows a block diagram illustrating a system for underbody view generation and presentation in a vehicle according to an exemplary embodiment.

Turning now to FIG. 2, a block diagram illustrating an exemplary implementation of a system 200 for underbody view generation and presentation in a driver assistance system equipped vehicle is shown. The system 200 may include a processor 240, a camera 220, a LIDAR 222, a global positioning system (GPS) 225, an inertial measurement unit (IMU) 233, a user interface 235, a memory 245, a vehicle controller 230 an accelerator controller 255, a brake controller 260 and a steering controller 270.

The system is operative to use various sensors such as a camera 220, IMU 233 and LIDAR 222 capable of detecting and mapping various external surfaces, objects and obstacles. Sensor fusion algorithms may be used to provide accurate detection and tracking of external objects as well as calculation of appropriate attributes such as relative velocities, accelerations, and the like. The camera 220 is operative to capture an image of a FOV which may include static and dynamic objects proximate to the vehicle. Image processing techniques may be used to identify and locate objects within the FOV. These objects may then be bounded and identified as an undesirable driving area and stored in a memory or added to a reference map for the ADAS.

The LIDAR 222 may be employed as a sensor on the host vehicle to detect surfaces and objects around the vehicle and provide a range to and orientation of those objects using reflections from the objects providing multiple scan points that combine as a point cluster range map, where a separate scan point is provided for every ½° or less across the field-of-view (FOV) of the sensor. Therefore, if a target vehicle or other object is detected in front of the subject vehicle, there may be multiple scan points that are returned that may be used to determine the distance of the target vehicle from the subject vehicle. By providing a cluster of scan return points, objects having various and arbitrary shapes, such as rocks, logs, cars, trucks, trailers, bicycle, pedestrian, guard rails, etc., may be more readily detected, where the bigger and/or closer the object to the subject vehicle the more scan points are provided.

Scan points detected by the LIDAR 222 may be used to generate a three-dimensional depth map of a FOV. According to an exemplary embodiment, the three-dimensional depth map may cover a forward-facing field of view wherein a off road driving surface may be mapped including relative elevations of the road surface, objects, obstacles and the like are represented within the three-dimensional depth map. Additional data, such as map data, coupled from a memory 245 or a wireless network may also be used to augment the sensor data in the generation of the depth map. Images of the FOV captured by the camera 220 may be correlated with the three-dimensional depth map to generate an augmented image or a virtual three-dimensional representation of the vehicle proximate area.

In an alternate embodiment, the LIDAR 222 may be replaced or augmented with a RADAR 224 system to generate the three-dimensional depth map of the FOV. The RADAR 224 system is operative to transmit an electromagnetic pulse towards the FOV and to receive a reflection of the electromagnetic pulse from an object, obstacle, and/or target within the FOV. The distance to the target from the RADAR 224 may be determined in response to the time of flight of the electromagnetic pulse. The RADAR 224 data may be used to augmented and/or correlate the LIDAR 222 data and/or the image data. The RADAR 224 may be a synthetic aperture RADAR 224 and may be directed towards the front of the vehicle and/or the FOV in order to map the off road surface.

Location data received from a GPS 225 as well as IMU 233 may be used to determine a relative vehicle location with respect to the received map data. The IMU 233 is a device used to report a specific force of a body. The IMU 233 may measure angular or linear acceleration and may be used to determine a lateral acceleration, a longitudinal acceleration, a yaw rate and pitch of a vehicle.

The user interface 235 may be a user input device, such as touch screen, dial, button and/or display located in the vehicle cabin and accessible to the driver. Alternatively, the user interface 235 may be a program running on an electronic device, such as a mobile phone, and in communication with the vehicle, such as via a wireless network. The user interface 235 is operative to collect instructions from a vehicle operator such as initiation and selection of an ADAS function, desired vehicle speed for adaptive cruise operations, selection of vehicle motion profiles for assisted driving, etc. In response to a selection by the vehicle operator, the user interface 235 may be operative to couple a control signal or the like to the processor 240 for activation of the ADAS function. The user interface 235 may be further operative to present data, such as a graphical user interface to a vehicle occupant. In an exemplary embodiment, the user interface 235 may be composed of a number of elements including a video display or the like.

In this exemplary embodiment, the processor 240 may be operative to perform a method for generated the underbody view in response to signals from various vehicle sensors, the vehicle controller 230 and the user interface 235. In one exemplary embodiment, the processor 240 may be operative to receive a request generated via the user interface 235 to initiate the underbody view image generation algorithm in response to a user request or a request from another ADAS function. The processor 240 is operative to receive a three-dimensional depth map of the field of view from a LIDAR 222 or the like. The processor 240 is further operative to receive one or more images from one or more cameras 220. The processor 240 is then operative to perform image processing algorithms on the images to determine corners, edges, and the like in order to align the images with the three-dimensional depth map. The processor 240 is then operative to generate, or augment, a three-dimensional model of the terrain within the FOV.

The processor 240 is further operative to receive vehicle dynamics data, such as steering angle, IMU 233 data, wheel speed, suspension data and inclinometer data to generate a kinematic model of the vehicle. The processor 240 is then operative to coordinate the kinematic model of the vehicle with the three-dimensional model of the terrain and to generate an augmented image representing a three-dimensional representation of the terrain with a generated image of a vehicle driveline. The processor 240 may be further operative to detect potential contact points between the vehicle and the terrain in response to the static and dynamic model of the vehicle with respect to the terrain and to highlight these potential contact points on the augmented image. The processor 240 is further operative to couple to the augmented image to the user interface 235 or other display for presentation to a vehicle operator.

In an alternate exemplary embodiment of the system 200 for underbody view generation, the processor 240 may further be operative to couple the underbody view generation and/or the three-dimensional representation of the terrain to another ADAS processor or ADAS algorithm for used with an automated driving operation. In an exemplary embodiment, the underbody view may be used by the automated driving operation to control the host vehicle for automated driving over the preferred route. The ADAS may generate control signals in response to the three-dimensional representation of the terrain, sensor outputs, map data, GPS locations and the like, and couple these control signals to the vehicle controller 230 in the automated driving operation.

The vehicle controller 230 may generate control signals for coupling to other vehicle system controllers, such as an accelerator controller 255, a brake controller 260 and a steering controller 270 in order to control the operation of the vehicle in response to the ADAS algorithm. The vehicle controller may be operative to adjust the speed of the vehicle by reducing the accelerator via the accelerator controller 255 or to apply the friction brakes via the brake controller 260 in response to a control signals generated by the processor 240. The vehicle controller may be operative to adjust the direction of the vehicle controlling the vehicle steering via the steering controller 270 in response to a control signals generated by the processor 240.

Figure 3:
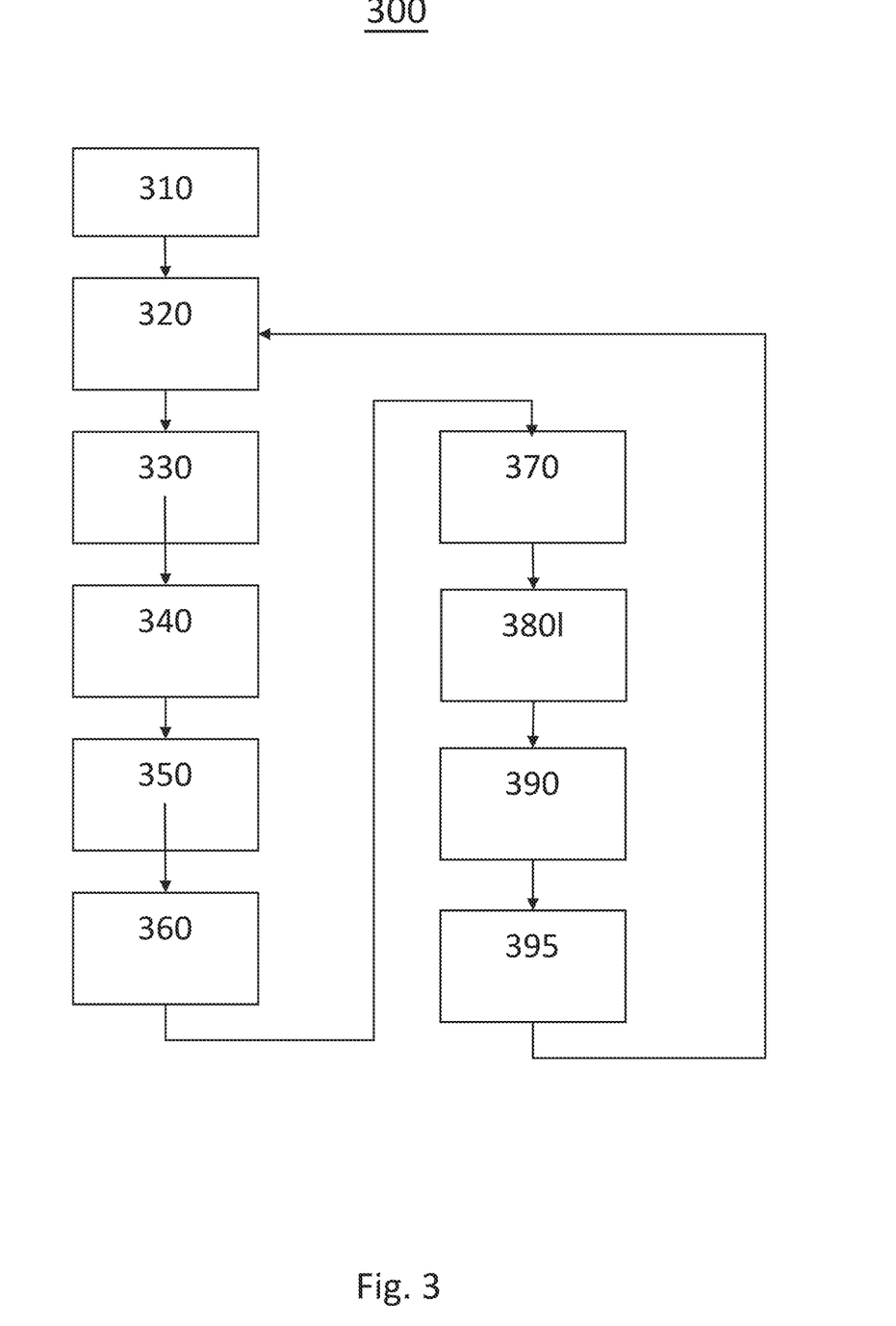
FIG. 3 shows a flow chart illustrating a method for underbody view generation and presentation in a vehicle according to an exemplary embodiment.

Turning now to FIG. 3, a flow chart illustrating an exemplary implementation of a method 300 for underbody view generation and presentation is shown. The method is first operated to initiate 310 the algorithm for generating the underbody view graphical user interface in response to a request. The requested may be generated by a user interface in response to a user input or may be generated in response to an ADAS request from another ADAS algorithm or the like. For example, the request may be generated in response to an initiation of off-road vehicle mode or an off-road adaptive cruise control, or crawl control, algorithm.

The method is next operative to perform 320 a LIDAR scan of the field of view to capture a depth map of the FOV wherein the FOV includes an off-road surface. The depth map include a depth measurement for a number of azimuth and elevation angles where the depth measurement is a distance between the LIDAR and an object. The depth map may be used to generate a three-dimensional representation of the FOV using a voxelization processor or the like. The three-dimensional representation may be a point cloud. The method may be further operative to augment a previous three-dimensional representation as the host vehicle changes location. In an exemplary embodiment, the method may compute a platform six degree of freedom pose from LIDAR scans matching, such as matching a previous scan against a current scan.

The method is next operative to capture 330 an image of the FOV using a camera wherein the FOV includes the off-road surface. The method may perform an image processing technique on the image, such as an edge detection technique, corner detection technique or the like in order to detect objects within the image, such as rock edges, obstructions or the like. In an exemplary embodiment, the method may compute a platform six degree of freedom pose from visual image frames matching, such as matching a previous frame versus a current frame. The image may be captured using a forward view camera. In addition, a fisheye surround-view camera may be used to capture a surround view image. The surround view image may then be processed to de-warp the image or the like. In an exemplary embodiment, the de-warped surround view image and the forward view image may be used to detect a visual feature point, such as an edge, corner or the like using image processing techniques.

The method is next operative to estimate 340 a vehicle platform orientation in response to vehicle platform sensor data. In one exemplary embodiment the vehicle platform orientation may be a six degree of freedom platform pose estimation. The vehicle platform orientation may be estimated in response to vehicle platform data such as steering angle, inclinometer, suspension kinematics, accelerations and the like. The vehicle platform orientation may further be estimated in response to an IMU data. The vehicle platform orientation may further include vehicle wheel heights with respect to a vehicle body. For example, a vehicle wheel traversing an obstacle may have a greater vehicle height than other wheels on a flat surface.

The method is next operative to compare 350 the LIDAR three-dimensional representation of the FOV to the estimated vehicle platform orientation to estimate a LIDAR vehicle pose estimation. The LIDAR vehicle pose estimation is operative to estimate a vehicle platform orientation with respect to the three-dimensional representation of the FOV. For example, the vehicle platform orientation and location may be coordinated with the three-dimensional representation of the FOV generated in response to the LIDAR scan of the FOV. In one exemplary embodiment, the method may compare relative vehicle heights and a vehicle incline to locate a vehicle position on a three-dimensional representation of the off-road surface. The method may be further operative to detect potential contact points between the vehicle and the off-road surface in response to the static and dynamic model of the.

The method is next operative to compare 360 the LIDAR vehicle pose estimation to the detected visual feature point generated in response to the captured images of the FOV and subsequent image processing algorithms and/or image recognition algorithms. The results of the image processor techniques may be used to correlate the camera FOV with the LIDAR FOV and to compute a vehicle orientation in response to the comparison. In response to the comparison, the method is operative to estimate a visual vehicle pose estimation. In an exemplary embodiment, the method may be operative to fuse localization solution from six degree of freedom pose generated from the IMU, LIDAR and cameras.

The method may next be operative to generate 370, or update, a three-dimensional terrain model in response to the LIDAR vehicle pose estimation and the visual vehicle pose estimation. The method may further use the vehicle platform orientation generated in response to the IMU data to generate the three-dimensional terrain model. In an exemplary embodiment, the method may be operative to self-construct or update 3-D terrain model in global coordinate frame.

The method may next be operative to store 380 the generated three-dimensional terrain model in a memory as an "upcoming" terrain model. In an exemplary embodiment, the three-dimensional terrain model may be retrieved when the vehicle is located over a corresponding location of the three-dimensional terrain model.

The method is next operative to project 390 a three-dimensional terrain subset model under the platform chassis in response to the stored three-dimensional terrain model. The three-dimensional terrain model may be projected onto the platform frame using the fused six degrees of freedom localization. The three-dimensional terrain model and the vehicle pose estimation may then be used to generate an augmented image wherein the augmented image may include a graphical representation of a vehicle suspension system, vehicle driveline and wheels overlaid on to an image of the underbody terrain. The method is next operative to display 395 the augmented image on a display to a vehicle operator.

Figure 4:
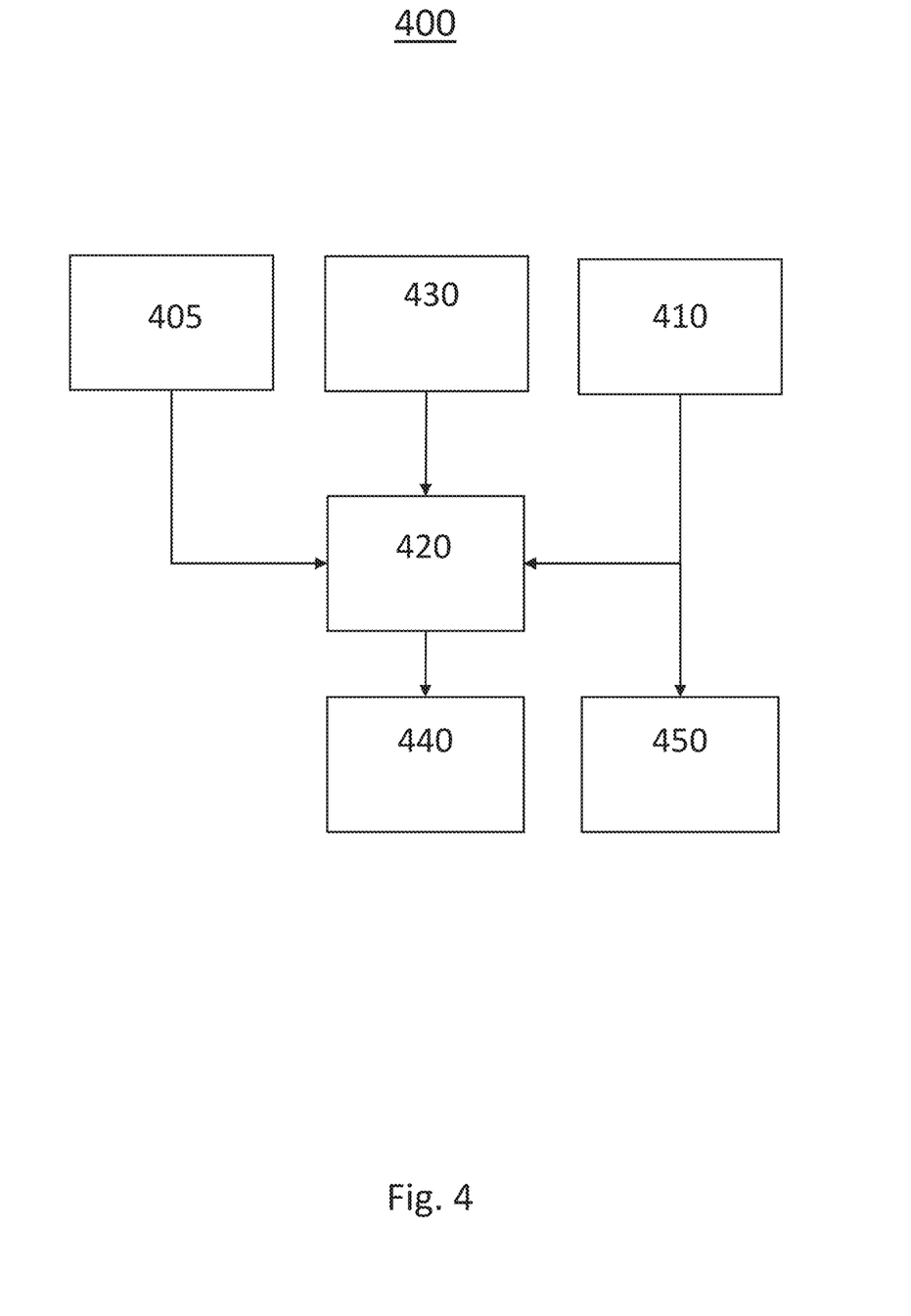
FIG. 4 shows a block diagram illustrating a system for underbody view generation and presentation in a vehicle according to another exemplary embodiment.

Turning now to FIG. 4, a block diagram illustrating another exemplary implementation of a system 400 for off road path route calculation including a LIDAR 405, a camera 410, a processor 420, a chassis sensor 430, a display 440 and a memory 450.

The LIDAR 405 operative to generate a depth map of an off-road surface. The depth map may be a point cloud or a three-dimensional model of the off-road surface. The LIDAR 405 is operative to transmit a laser pulse and to receive a reflection of the laser pulse. The distance to the reflecting object, or target, is determined in response to the time of flight of the laser pulse. This process is repeated for a number of azimuth and elevation angles from the LIDAR 405 to generate a depth map of the field of view. The greater the number of azimuth and elevation angles at which the measurements are made increases the resolution of the depth map. Magnitude of the reflected LIDAR pulses may be used to determine an orientation of an object within the FOV. For example, a target that is orthogonal to the LIDAR 405 may return a reflected pulse of a greater amplitude than an target at an oblique angle to the LIDAR 405.

The camera 410 for capturing an image of the off-road surface. The image may be composite image generated in response to a number of images including fisheye views. In an exemplary embodiment, the camera 410 is a forward facing camera 410 operative to periodically capture images of a forward FOV. The images may be stored in a memory 450 or the like.

The chassis sensor 430 operative to detect an orientation of a host vehicle. In an exemplary embodiment, the chassis sensor 430 is at least one of an inertial measurement unit, a steering angle sensor, a wheel speed sensor, a suspension sensor and an inclinometer. In one exemplary embodiment the orientation of the host vehicle is a six degrees of freedom orientation. Six degrees of freedom may include lateral position, longitudinal position, elevation, combined with changes in orientation through rotation about three perpendicular axes, such as yaw, pitch, and roll.

The processor 420 operative to generate an augmented image in response to the depth map, the image and the orientation, wherein the augmented image depicts an underbody view of the host vehicle and a graphic representative of a host vehicle suspension system For example, the processor 420 may be operative to generate a three-dimensional surface in response to the depth map. The processor 420 may be operative to perform an edge detection function on the image to correlate the image with the depth map from the LIDAR. The processor 420 may be operative to estimate a host vehicle location with respect to the off-road surface in response to the orientation of the host vehicle and the depth map. The processor 420 may be further operative to estimate a contact point between the host vehicle and the off-road surface in response to the depth map, the orientation of the host vehicle and one or more physical characteristics of the host vehicle, such as clearance, wheel height, and/or driveline configuration.

The display 440 is operative to display the augmented image to a host vehicle operator. The augmented image may be displayed as part of a graphical user interface generated by the processor 420. The augmented image further includes an indication of the contact point estimated by the processor 420. The exemplary system 400 may further include a memory 450 is operative for storing the depth map and the image and wherein the augmented image is generated in response to the host vehicle being located over the off-road surface.

Figure 5:
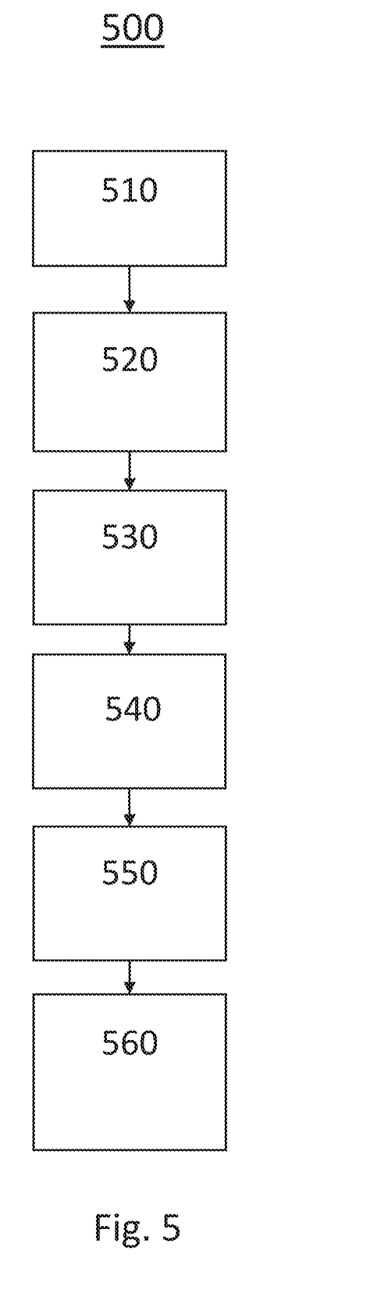
FIG. 5 shows a flow chart illustrating a method for underbody view generation and presentation in a vehicle according to another exemplary embodiment.

Turning now to FIG. 5, a flow chart illustrating an exemplary implementation of a method 500 for off road adaptive cruise control in a host vehicle is shown. The method may be performed by an ADAS processor or the like and is first operative for generating 510, in response to a LIDAR, a point cloud of a field of view of an off-road surface. The LIDAR may be operative to generate a depth map of the FOV which may be used to generate a three-dimensional representation of a field of view of an off-road surface. The method is next operative for capturing 520, with a camera, an image of the field of view of the off-road surface. Image processing techniques may be performed, by an image processor or the like, on the image to coordinate the image location with the three-dimensional representation of the field of view. A composite three-dimensional representation may be generated in response to a combination of the image and the LIDAR depth map.

The method is next operative for determining 530 a vehicle orientation in response to a chassis sensor. The chassis sensor may be an IMU, an inclinometer, a steering angle sensor, a wheel speed sensor, and/or a suspension sensor and an inclinometer or the like and may be operative to determine the vehicle orientation over six degrees of freedom. In response to the vehicle orientation, the method is next operative for estimating 540 a location of the vehicle within the off-road surface. The vehicle location may be further estimated in response to a GPS sensor or other global navigation satellite signal system. In addition, the vehicle location may be estimated in response to a wireless communications system signal or the like.

The method is next operative for generating 550, with a processor, an augmented image depicting a three-dimensional view of the off-road surface in response to the three-dimensional representation and the image, and wherein the augmented image further includes a graphical representation of a vehicle drive train representative of the location of the vehicle within the off-road surface. The augmented image depicts an underbody view of the vehicle with the relative position of the vehicle drive train depicted. For example, the augmented image may be representative of a host vehicle underbody component relative to the off-road surface. The augmented image may further depict potential contact points between the vehicle and the off-road surface in response to the static and dynamic model of the vehicle with respect to the off-road surface. The processor 240 is further operative to couple to the augmented image to the user interface 235 or other display for presentation to a vehicle operator.

The method is operative for displaying 560, with a vehicle cabin display, the augmented image to a host vehicle operator. The augmented image may be presented as a part of a graphical user interface displayed on a vehicle cabin display to a vehicle operator or a vehicle occupant. The method may further be operative for estimating a contact point in response to the three-dimensional representation and the vehicle orientation and wherein the augmented image includes an indication of the contact point.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
a LIDAR operative to generate a depth map of an off-road surface within a forward field of view including a first location;
a camera for capturing an image of the off-road surface within the forward field of view including the first location;
a chassis sensor operative to detect an orientation of a host vehicle;
a sensor configured for determining a host vehicle location;
a processor operative to generate an augmented image in response to the depth map, the image, the host vehicle location, and the orientation, wherein the augmented image depicts an underbody view of the host vehicle including the first location and a graphic representative of a host vehicle suspension system, wherein the processor is further operative to estimate a contact point between the host vehicle and the off-road surface and wherein the augmented image further includes an indication of the contact point; and
a display operative to display the augmented image to a host vehicle operator.

2. The apparatus of claim 1 wherein the processor is operative to generate a three-dimensional surface in response to the depth map.

3. The apparatus of claim 1 wherein the processor is operative to perform an edge detection function on the image to correlate the image with the depth map.

4. The apparatus of claim 1 further including a memory for storing the depth map and the image and wherein the image and the depth map are captured when the host vehicle location is a second location and wherein the augmented image is generated in response to the host vehicle being located over the first location.

5. The apparatus of claim 1 wherein the orientation of the host vehicle is a six degrees of freedom orientation.

6. The apparatus of claim 1 wherein the processor is operative to estimate the host vehicle location with respect to the off-road surface in response to the orientation of the host vehicle.

7. The apparatus of claim 1 wherein the processor is further operative to generate a static and dynamic model of the host vehicle with respect to the off-road surface to estimate the contact point between the host vehicle and the off-road surface.

8. The apparatus of claim 1 wherein the chassis sensor is at least one of an inertial measurement unit, a steering angle sensor, a wheel speed sensor, a suspension sensor and an inclinometer.

9. A method performed by a processor comprising:
generating, with a LIDAR, a three-dimensional representation of a forward field of view of an off-road surface including a first location;
capturing, with a camera, an image of the forward field of view of the off-road surface including the first location;
determining a vehicle orientation in response to a chassis sensor;
estimating a location of a vehicle within the off-road surface in response to the vehicle orientation;
generating, with the processor, an augmented image depicting a three-dimensional view of the off-road surface in response to the three-dimensional representation and the image, and wherein the augmented image further includes a graphical representation of a vehicle drive train representative of the location of the vehicle within the off-road surface;
estimating, by the processor, a contact point between the vehicle and the off-road surface; and
displaying, with a vehicle cabin display, the augmented image including an indication of the contact point to a host vehicle operator.

10. The method of claim 9 wherein the three-dimensional representation of the forward field of view is generated in response to a LIDAR depth map.

11. The method of claim 9 further including detecting an edge within the image and aligning the three-dimensional representation and the image in response to the edge.

12. The method of claim 9 further including storing, in a memory, the three-dimensional representation and the image and wherein the augmented image is generated in response to the vehicle being located over the first location.

13. The method of claim 9 wherein the vehicle orientation is a six degrees of freedom orientation.

14. The method of claim 9 wherein estimating the location of the vehicle within the off-road surface includes comparing the vehicle orientation to the three-dimensional representation.

15. The method of claim 9 wherein the augmented image is generated in response to the location of the vehicle arriving at the first location.

16. The method of claim 9 wherein the chassis sensor is at least one of an inertial measurement unit, a steering angle sensor, a wheel speed sensor, a suspension sensor and an inclinometer.

17. The method of claim 9 wherein estimating the location of the vehicle within the off-road surface includes detecting a vehicle location with a global positioning sensor.

18. The method of claim 9 wherein the augmented image is provides a three dimensional prospective to the host vehicle operator representative of a host vehicle underbody component relative to the off-road surface.

19. An apparatus for generating a graphical user interface comprising:
a LIDAR for generating a depth map of a forward field of view including a first location;
a camera for capturing an image of the forward field of view including the first location;
a vehicle sensor for estimating a vehicle orientation;
a sensor for determining a vehicle location
a processor for generating a three-dimensional representation of the forward field of view in response to the depth map and the image and for generating an augmented image in response to the vehicle location, the vehicle orientation and the three-dimensional representation of the forward field of view, wherein the processor is further operative to estimate a contact point between a vehicle and an object within the forward field of view and wherein the augmented image further includes an indication of the contact point; and
a display operative to display the graphical user interface including the augmented image including the indication of the contact point to a vehicle operator.

20. The apparatus for generating a graphical user interface of claim 19 wherein the processor is further operative to estimate the vehicle location in response to the vehicle orientation and the three-dimensional representation of the forward field of view and wherein the augmented image is generated in response to the vehicle location arriving at a location within the forward field of view.

\* \* \* \* \*